(12) United States Patent
Hatta et al.

(10) Patent No.: US 8,828,591 B2
(45) Date of Patent: Sep. 9, 2014

(54) EXTERNAL PACKAGING MATERIAL FOR BATTERY DEVICE, NONAQUEOUS ELECTROLYTE SECONDARY BATTERY USING THE SAME, AND BATTERY PACK

(75) Inventors: Kazuhito Hatta, Fukushima (JP); Masato Sato, Fukushima (JP)

(73) Assignee: Sony Corporation, Tokyo (JP)

(*) Notice: Subject to any disclaimer, the term of this patent is extended or adjusted under 35 U.S.C. 154(b) by 743 days.

(21) Appl. No.: 11/681,034

(22) Filed: Mar. 1, 2007

(65) Prior Publication Data
US 2007/0207379 A1 Sep. 6, 2007

(30) Foreign Application Priority Data
Mar. 2, 2006 (JP) ................. P2006-055918

(51) Int. Cl.
*H01M 2/00* (2006.01)
*H01M 2/02* (2006.01)
(52) U.S. Cl.
USPC ................. 429/163; 429/177; 429/178
(58) Field of Classification Search
None
See application file for complete search history.

(56) References Cited

U.S. PATENT DOCUMENTS

| 4,011,371 | A  | * | 3/1977  | Hallett et al. | 429/185 |
|-----------|----|---|---------|----------------|---------|
| 6,632,538 | B1 | * | 10/2003 | Yamazaki et al.| 428/461 |
| 6,653,018 | B2 | * | 11/2003 | Takahashi et al.| 429/185 |
| 6,902,844 | B2 | * | 6/2005  | Yageta et al.  | 429/185 |
| 2003/0054241 | A1 | * | 3/2003 | Yamashita et al.| 429/181 |
| 2003/0118900 | A1 | * | 6/2003 | Otohata       | 429/162 |
| 2005/0112461 | A1 | * | 5/2005 | Amine et al.  | 429/185 |
| 2005/0136324 | A1 | * | 6/2005 | Yamada et al. | 429/175 |
| 2006/0035139 | A1 | * | 2/2006 | Kumakura et al.| 429/124 |

FOREIGN PATENT DOCUMENTS

| JP | 11-7921      | 1/1999  |
|----|--------------|---------|
| JP | 11-86808     | 3/1999  |
| JP | 2000-173558  | 6/2000  |
| JP | 2001-068074  | 3/2001  |
| JP | 2001-155790  | 6/2001  |
| JP | 2001-297736  | 10/2001 |
| JP | 2002-25511   | 1/2002  |
| JP | 2003-187762  | 7/2003  |
| JP | 2004-39358   | 2/2004  |
| JP | 2004-071179  | 3/2004  |
| JP | 2004-296174  | 10/2004 |
| JP | 2004-327041  | 11/2004 |
| JP | 2004-327045  | 11/2004 |
| JP | 2007-173212  | 7/2007  |

OTHER PUBLICATIONS

Japanese Office Action issued May 22, 2012, for corresponding Japanese Appln. No. 2007-053015.

* cited by examiner

*Primary Examiner* — Cynthia K. Walls
(74) *Attorney, Agent, or Firm* — K&L Gates LLP

(57) ABSTRACT

An external packaging material for covering a battery device is provided. The packaging material includes a laminated film having a laminated structure having two or more resin film layers stacked. In the external packaging material, the laminated structure has no metallic foil, and at least one layer in the resin film layers contains a moisture absorbing material.

18 Claims, 6 Drawing Sheets

RELATED ART

EXTERNAL PACKAGING MATERIAL FOR BATTERY DEVICE, NONAQUEOUS ELECTROLYTE SECONDARY BATTERY USING THE SAME, AND BATTERY PACK

CROSS REFERENCES TO RELATED APPLICATIONS

The present application claims priority to Japanese Patent Application JP 2006-055918 filed in the Japanese Patent Office on Mar. 2, 2006, the entire contents of which is being incorporated herein by reference.

BACKGROUND

The present disclosure relates to an external packaging material for covering a battery device, a nonaqueous electrolyte secondary battery using the same, and a battery pack. More particularly, the present disclosure is concerned with an external packaging material for battery device, which is made of a specific thin laminated film using no metallic foil, and which is advantageous not only in that it can reduce the thickness of the external packaging structure for a battery device in a nonaqueous electrolyte secondary battery, but also in that it can improve the battery in discharge capacity, a nonaqueous electrolyte secondary battery and a battery pack using the same.

In recent years, various types of portable electronic devices, such as videotape recorders (VTRs) with camera, mobile phones, and laptop computers, are widely used, and those having smaller size and weight are being developed. As the portable electronic devices are miniaturized, demand for battery as a power source of them is rapidly increasing, and, for reducing the size and weight of the device, a battery for the device must be designed so that the battery is lightweight and thin and the space in the device can be efficiently used. As a battery that can meet such demands, a lithium ion battery having a large energy density and a large power density is preferred.

Especially, batteries having high selectivity of shape, sheet-type batteries having a reduced thickness and a large area, or card-type batteries having a reduced thickness and a small area are desired, but the method having been employed in which a metallic can is used in the external packaging for battery makes it difficult to produce a battery having a reduced thickness.

For solving the problem, studies are made on batteries in which no liquid electrolyte is present by adding a substance having an ability to set the solution to an electrolytic solution or employing a gel electrolyte composed of a polymer. In these batteries, the adhesion between the electrode and the electrolyte is so strong that the contacts between the battery elements can be kept. Accordingly, it is enabled to fabricate a thin battery using an external packaging material in the form of film, such as an aluminum laminated film.

FIG. 1 shows the appearance of a battery using a laminated film as an external packaging material. This battery 1 is prepared by covering with a laminated film a battery device including a positive electrode and a negative electrode which are stacked with a separator disposed in between and spirally wound or zigzag folded, and sealing the laminated film around the battery device. In the battery 1, a positive electrode terminal 2a and a negative electrode terminal 2b (hereinafter, frequently referred to as "metal terminal 2" unless otherwise specified) connected to the positive electrode and the negative electrode, respectively, are electrically introduced from the battery through sealed portions of the laminated film. It is noted that, for improving the adhesion to the laminated film 4 for covering the battery device, the positive electrode terminal 2a and the negative electrode terminal 2b are respectively coated with sealants 3a and 3b which are resin leaves composed of maleic anhydride-modified polypropylene (PPa) or the like.

The laminated film used in the external packaging for battery is a multilayer film having moisture barrier properties and insulation properties, which includes a metal layer sandwiched between an outer resin layer and an inner resin layer each composed of a resin film. The metal layer has the most important role in preventing penetration of moisture, oxygen, or light to protect the contents of the battery, and, from the viewpoint of lightweightness, excellent elongation, low cost, and good processability, aluminum (hereinafter, frequently referred to as "Al") is the most commonly used. As the outer resin layer, from the viewpoint of good appearance, high toughness, and excellent flexibility, nylon or polyethylene terephthalate (hereinafter, frequently referred to as "PET") is used. The inner resin layer is a portion to be melted and sealed by heat or ultrasonic waves, and hence polyolefin is appropriate, and casted polypropylene (hereinafter, frequently referred to as "CPP") is generally used. Bonding agent layers are formed between the metal layer and the outer resin layer and between the metallic foil and the inner resin layer.

For achieving a battery capacity as large as possible, it is necessary that a battery device as large as possible be contained in a predetermined outer size, and therefore it is desired that the external packaging for battery has a reduced thickness. For preventing penetration of moisture, oxygen, or light to protect the contents of the battery, the aluminum layer must prevent light penetration even during the shaping or processing, and therefore the aluminum layer needs a thickness of 30 μm or more, and has the largest thickness among the constituent layers of the laminated film. Accordingly, if the resin covering both sides of Al has barrier properties equivalent to or higher than those of Al, the Al layer is not required, enabling the most effective reduction of the thickness of the laminated film.

In the past, not only Al but also the resin cross-section of the sealed portion, especially in the battery structure as shown in FIG. 1, the sealed portion of the laminated film 4 through which the metal terminal 2 is electrically introduced are required to have the barrier properties of the external packaging. In covering the battery device with the laminated film 4 and sealing the laminated film around the battery device, the inner resin layer is melted and bonded, but the adhesion between the metal terminal 2 electrically introduced from the battery device and the inner resin layer is poor. Therefore, moisture is likely to penetrate the battery through the interface between the metal terminal 2 and the laminated film 4. If moisture penetrates the battery, an unfavorable electrochemical reaction occurs in the battery, so that the battery properties become poor or gas is generated in the battery to cause battery expansion.

For solving the problem, in Japanese Patent Application Publication (KOKAI) No. 2001-297736 and Japanese Patent Application Publication (KOKAI) No. 2004-039358, a method in which an auxiliary member is disposed between the metal terminal and the laminated film to improve the sealing properties is disclosed.

In the invention described in the Japanese Patent Application Publication (KOKAI) No. 2001-297736, the sealing properties are improved by bonding at least a linear low-density polyethylene film to the inner resin layer in the laminated film through a bonding agent and disposing an acid-modified, linear low-density polyethylene film as an auxiliary member between the metal terminal and the laminated film. Among thermoplastic resins, polyethylene has low moisture penetration, and hence can prevent moisture penetration through the auxiliary member.

In the invention described in the Japanese Patent Application Publication (KOKAI) No. 2004-039358, moisture penetration is prevented by using a thermoplastic resin containing a moisture absorbing agent, such as silica gel, activated carbon, or zeolite, in part of or whole of the auxiliary member. In Japanese Patent Application Publication (KOKAI) No. 2004-039358, there is a description of an example of auxiliary member such that, for securing the sealing properties, a reduced amount of the moisture absorbing agent is dispersed at a portion near the end of the laminated film through which the metal terminal is electrically introduced, and an increased amount of the moisture absorbing agent is dispersed at an inner portion of the battery.

Further, in the inventions described in Japanese Patent Application Publication (KOKAI) No. 11-086808 and Japanese Patent Application Publication (KOKAI) No. 11-007921, at the resin cross-section of the sealed portion other than the terminal portion, a moisture absorbing material, such as magnesium sulfate, is dispersed in a hot-melt resin inside of the Al layer to prevent moisture penetration through the sealed interface.

In Japanese Patent Application Publication (KOKAI) No. 2002-025511, a problem of further moisture penetration through the inner hot-melt resin is solved by a method in which a metal deposited film is formed on the resin surface.

In the above-mentioned techniques, moisture penetration through the cross-section of the sealed portion can be prevented. However, moisture penetration through the covering resin having no Al cannot be prevented. In addition, it is very difficult for the moisture absorbing agent to continue to absorb moisture for a long term. Further, the metal deposited film formed in the laminated film is easily broken during the processing (e.g., shaping) thus making it difficult to prevent moisture penetration.

SUMMARY

In view of the problems in the related art, the present disclosure provides an external packaging material for battery device, a nonaqueous electrolyte secondary battery and a battery pack using the same. The external packaging material is composed of a thin laminated film having no metallic foil (e.g., no Al foil). The material is advantageous in that, in a case where a battery device is covered with the laminated film, not only moisture penetration through the cross-section of the sealed portion but also moisture penetration through the whole of the laminated film are prevented for a relatively long term. The material is also advantageous in that the external packaging material can achieve a battery which does not suffer lowering in the moisture penetration prevention properties during the production of the battery.

It has been determined that the material can be obtained by incorporating a moisture absorbing material into an appropriate layer in the laminated structure of a laminated film using no metallic foil.

Specifically, an external packaging material for battery device according to an embodiment is an external packaging material for covering a battery device. The external packaging material is composed of a laminated film having a laminated structure having two or more resin film layers stacked. In the material, the laminated structure has no metallic foil, and at least one layer in the resin film layers contains a moisture absorbing material.

An external packaging material for battery device according to anther embodiment is an external packaging material for covering a battery device. The external packaging material is composed of a laminated film having a laminated structure having two or more resin film layers stacked with a bonding agent layer or layers in between. In the material, the laminated structure has no metallic foil, and the bonding agent layer or at least one layer in the bonding agent layers contains a moisture absorbing material.

A nonaqueous electrolyte secondary battery according to an embodiment is a nonaqueous electrolyte secondary battery which includes: a battery device having a positive electrode and a negative electrode which are stacked with a separator disposed in between and spirally wound; and an external packaging material for covering the battery device. The external packaging material is sealed around the battery device so that electrode terminals of the positive electrode and negative electrode are electrically introduced from the battery device. In the battery, the external packaging material is composed of a laminated film having a laminated structure having two or more resin film layers stacked. In the external packaging material, the laminated structure has no metallic foil, and at least one layer in the resin film layers contains a moisture absorbing material.

A nonaqueous electrolyte secondary battery according to another embodiment is a nonaqueous electrolyte secondary battery which includes: a battery device having a positive electrode and a negative electrode which are stacked with a separator disposed in between and spirally wound; and an external packaging material for covering the battery device. The external packaging material is sealed around the battery device so that electrode terminals of the positive electrode and negative electrode are electrically introduced from the battery device. In the battery, the external packaging material is composed of a laminated film having a laminated structure having two or more resin film layers stacked with a bonding agent layer or layers disposed in between. In the external packaging material, the laminated structure has no metallic foil, and the bonding agent layer or at least one layer in the bonding agent layers contains a moisture absorbing material.

Furthermore, a battery pack according to an embodiment is a battery pack including a nonaqueous electrolyte secondary battery, a casing and a wiring board. The nonaqueous electrolyte secondary battery includes a battery device having a positive electrode and a negative electrode which are stacked with a separator disposed in between and spirally wound; and an external packaging material for covering the battery device. The external packaging material is sealed around the battery device so that electrode terminals of the positive electrode and negative electrode are electrically introduced from the battery device. The casing contains therein the nonaqueous electrolyte secondary battery. The wiring board has a connection terminal for electrically connecting the nonaqueous electrolyte secondary battery with an electric device and a protection circuit for electrically protecting the nonaqueous electrolyte secondary battery. In the battery pack, the external packaging material in the nonaqueous electrolyte secondary battery is composed of a laminated film having a laminated structure having two or more resin film layers stacked. In the external packaging device, the laminated structure has no metallic foil, and at least one layer in the resin film layers contains a moisture absorbing material.

Further, a battery pack according to another embodiment is a battery pack including a nonaqueous electrolyte secondary battery, a casing and a wiring board. The nonaqueous electrolyte secondary battery includes: a battery device having a positive electrode and a negative electrode which are stacked with a separator disposed in between and spirally wound; and an external packaging material for covering the battery device. The external packaging material is sealed around the battery device so that electrode terminals of the positive electrode and negative electrode are electrically introduced from the battery device. The casing for containing the nonaqueous electrolyte secondary battery. The wiring board having a connection terminal for electrically connecting the nonaqueous electrolyte secondary battery with an electric device and a protection circuit for electrically protecting the nonaqueous electrolyte secondary battery. In the battery pack, the external packaging material in the nonaqueous electrolyte secondary battery is composed of a laminated film having a laminated structure having two or more resin film layers stacked with a bonding agent layer or layers disposed in between. In the external packaging material, the laminated structure has no metallic foil, and the bonding agent layer or at least one layer in the bonding agent layers contains a moisture absorbing material.

Additional features and advantages are described herein, and will be apparent from, the following Detailed Description and the figures.

DETAILED DESCRIPTION

Embodiments are described below in detail with reference to the accompanying drawings. In the present specification, a nonaqueous electrolyte secondary battery using a gel electrolyte is described as an example. In the present specification, "%" is given to indicate mass percentage unless otherwise specified.

Figure 1:
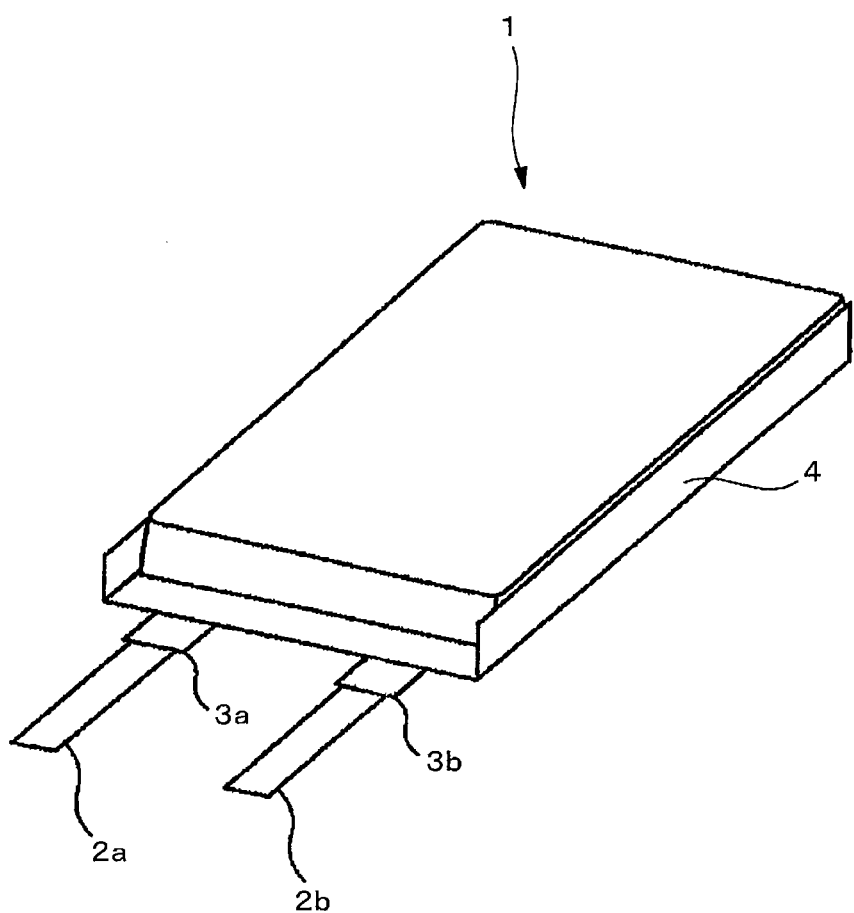
FIG. 1 is a perspective view showing the appearance of a battery using a laminated film as an external packaging material.
Figure 2:
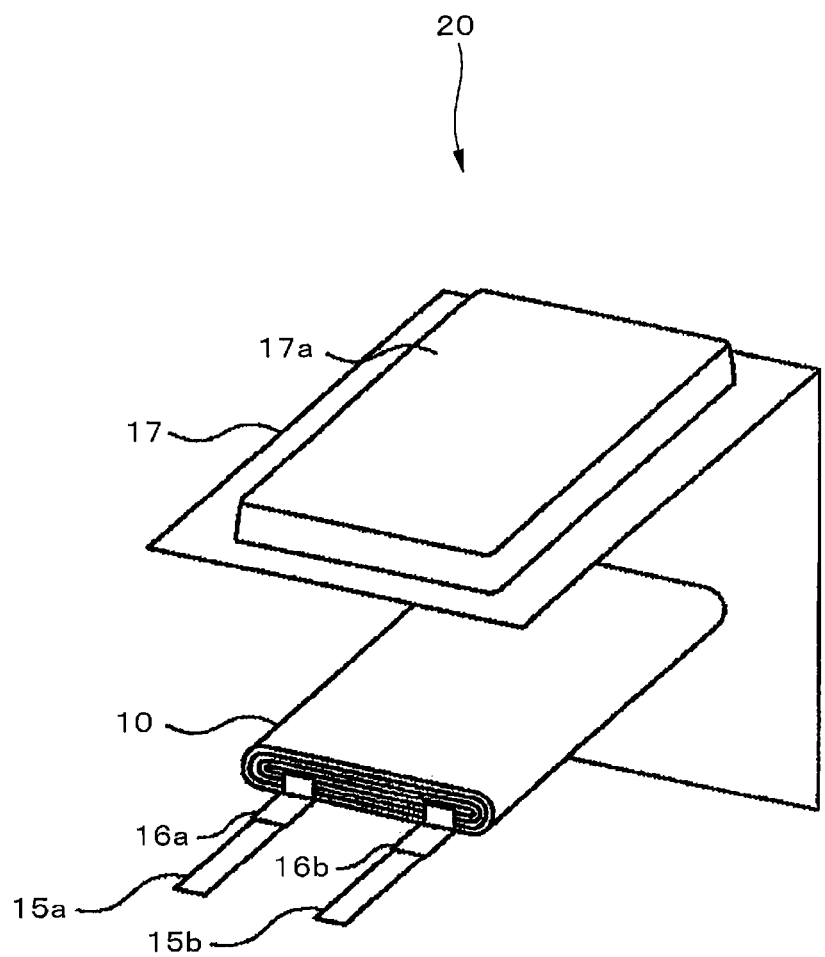
FIG. 2 is an exploded perspective view showing a nonaqueous electrolyte secondary battery according to an embodiment.

FIG. 2 is an exploded perspective view showing a nonaqueous electrolyte secondary battery according to one embodiment. In this figure, a battery 20 includes a battery device 10 covered with a laminated film 17 as an example of the external packaging material for battery device of the present invention, and the battery device 10 is placed in a recess portion 17a (space 17a) formed in the laminated film 17 and the laminated film is sealed at its edge. In the present embodiment, the space 17a has a rectangular plate-shaped space to match the shape of the battery device 10 having a rectangular plate shape.

Figure 3:
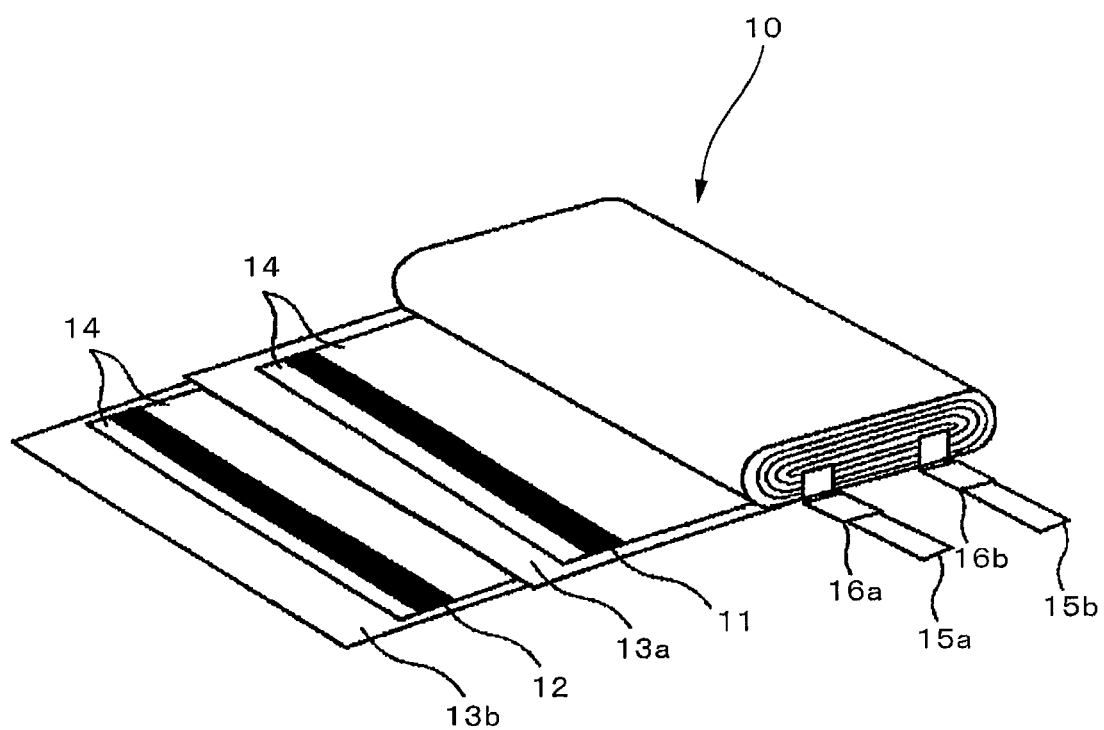
FIG. 3 is a perspective view showing the structure of a battery device 10 to be contained in one example of the external packaging material according to an embodiment.

Next, the construction of the battery device 10 is described. FIG. 3 is a perspective view showing the structure of the battery device 10 to be covered with and contained in the laminated film 17. In this figure, the battery device 10 includes a strip positive electrode 11, a separator 13a, a strip negative electrode 12 disposed opposite the positive electrode 11, and a separator 13b which are stacked on one another and spirally wound in the longitudinal direction. Each of the positive electrode 11 and the negative electrode 12 has gel electrolytes 14 applied to the both surfaces.

A positive electrode terminal 15a connected to the positive electrode 11 and a negative electrode terminal 15b connected to the negative electrode 12 (hereinafter, referred to as "electrode terminal 15" unless otherwise the terminal is specified) are electrically introduced from the battery device 10. For improving the adhesion to the laminated film 17 for covering the battery device, the positive electrode terminal 15a and the negative electrode terminal 15b are respectively coated with sealants 16a and 16b (hereinafter, frequently referred to as "sealant 16" unless otherwise the sealant is specified) which are resin leaves composed of maleic anhydride-modified polypropylene (PPa) or the like.

Constituent elements of the nonaqueous electrolyte secondary battery are described below in detail.

[Positive Electrode]

The positive electrode includes a positive electrode active material layer containing a positive electrode active material formed on both sides of a current collector for positive electrode. The current collector for positive electrode is composed of a metallic foil, such as an aluminum (Al) foil.

The positive electrode active material layer is composed of, for example, a positive electrode active material, a conductor, and a binder. The amounts of the positive electrode active material, conductor, binder, and solvent may be arbitrary as long as they are uniformly dispersed.

As the positive electrode active material, a metal oxide, a metal sulfide, or a specific polymer can be used in accordance with the type of a desired battery. For example, as the positive electrode active material constituting a lithium ion battery, a compound oxide of lithium and a transition metal, represented by the following formula (1):

$$Li_xMO_2 \tag{1}$$

where M represents at least one transition metal, and X varies depending on the charged or discharged state of the battery, and is generally 0.05 to 1.10, is mainly used. As the transition metal (M) constituting the lithium compound oxide, cobalt (Co), nickel (Ni), manganese (Mn), or the like is used.

Specific examples of the lithium compound oxides include $LiCoO_2$, $LiNiO_2$, $LiMn_2O_4$, and $LiNi_yCo_{1-y}O_2$ (0<y<1). A solid solution obtained by replacing part of the transition metal element in the lithium compound oxide by another element can be used. Examples of the solid solutions include $LiNi_{0.5}Co_{0.5}O_2$ and $LiNi_{0.8}Co_{0.2}O_2$. These lithium compound oxides can generate high voltage and have excellent energy density. Alternatively, as the positive electrode active material, a metal sulfide or metal oxide containing no lithium, such as $TiS_2$, $MoS_2$, $NbSe_2$, or $V_2O_5$, may be used. These positive electrode active materials may be used individually or in combination.

As the conductor, a carbon material, such as carbon black or graphite, is used. As the binder, for example, polyvinylidene fluoride, polytetrafluoroethylene, or polyvinylidene fluoride is used. As the solvent, for example, N-methylpyrrolidone (NMP) is used.

The positive electrode active material, binder, and conductor are uniformly mixed with each other to prepare a positive electrode composition, and the positive electrode composition is dispersed in a solvent to form slurry. Then, the resultant slurry is uniformly applied to the current collector for positive electrode by a doctor blade method or the like, and then dried at a high temperature to remove the solvent, thus forming the positive electrode active material layer.

The positive electrode 11 has the positive electrode terminal 15a joined to one end of the current collector for positive electrode by spot welding or ultrasonic welding. It is desired that the positive electrode terminal 15a is composed of a metallic foil or mesh, but the positive electrode terminal may be composed of any material other than metals as long as it is electrochemically and chemically stable and electrically conductive. An example of the material for the positive electrode terminal 15a includes aluminum.

[Negative Electrode]

The negative electrode includes a negative electrode active material layer containing a negative electrode active material formed on both sides of a current collector for negative electrode. The current collector for negative electrode is composed of a metallic foil, such as a copper (Cu) foil, a nickel foil, or a stainless steel (SUS) foil.

The negative electrode active material layer includes, for example, a negative electrode active material, if necessary, a conductor, and a binder. Like the positive electrode active material and others, the amounts of the negative electrode active material, conductor, binder, and solvent may be arbitrarily set.

As the negative electrode active material, lithium metal, a lithium alloy, a carbon material capable of being doped/dedoped with lithium, or a composite material of a metal material, a polymer, an oxide, and a carbon material is used. Specific examples of carbon materials capable of being doped/dedoped with lithium include graphite, hardly graphitizable carbon, and easily graphitizable carbon. More specifically, a carbon material, such as pyrolytic carbon, coke (pitch coke, needle coke, or petroleum coke), graphite, glassy carbon, a calcined product of an organic polymer compound (obtained by carbonizing a phenolic resin, a furan resin, or the like by calcination at an appropriate temperature), carbon fiber, or activated carbon, can be used. Further, as a material capable of being doped/dedoped with lithium, a polymer, such as polyacetylene or polypyrrole, or an oxide, such as $SnO_2$, can be used.

As a material capable of being alloyed with lithium, a variety types of metals can be used, but tin (Sn), cobalt (Co), indium (In), aluminum, silicon (Si), or an alloy thereof is generally used. In a case of using metallic lithium, it is not always necessary to mix lithium powder with a binder to form a coating film, and a rolled lithium metallic foil may be contact-bonded to a current collector.

As the binder, for example, polyvinylidene fluoride (PVdF) or a styrene-butadiene rubber (SBR) is used. As the solvent, for example, N-methylpyrrolidone or methyl ethyl ketone (MEK) is used.

The negative electrode active material, binder, and conductor are uniformly mixed with each other to prepare a negative electrode composition, and the negative electrode composition is dispersed in a solvent to form slurry. Then, the resultant slurry is uniformly applied to the current collector for negative electrode by a method similar to that used for the positive electrode, and then dried at a high temperature to remove the solvent, thus forming the negative electrode active material layer.

Like the positive electrode 11, the negative electrode 12 has the negative electrode terminal 15b joined to one end of the current collector by spot welding or ultrasonic welding, and the negative electrode terminal 15b may be composed of any material other than metals as long as it is electrochemically and chemically stable and electrically conductive. Copper and nickel may be employed as examples of the materials for the negative electrode terminal 15b.

It is preferred that the positive electrode terminal 15a and the negative electrode terminal 15b are electrically introduced from the same side, for example, in a case where the battery device 10 has a rectangular plate shape as shown in FIG. 3, they are preferably electrically introduced from one side (generally one short side), but they may be electrically introduced from any sides as long as short-circuiting or the like does not occur and there is no adverse effect on the battery performance. With respect to the joint of the positive electrode terminals 15a and 15b, the joint position and the method for the joint are not limited to the examples mentioned above as long as electrical contact can be made.

[Electrolytic Solution]

In the electrolytic solution, an electrolyte salt and a nonaqueous solvent generally used in a lithium ion battery can be used.

Specific examples of nonaqueous solvents include ethylene carbonate, propylene carbonate, γ-butyrolactone, dimethyl carbonate, diethyl carbonate, ethylmethyl carbonate, dipropyl carbonate, ethylpropyl carbonate, and solvents obtained by replacing hydrogen in the above carbonate by a halogen. These solvents may be used individually or in combination with a predetermined formulation.

As a lithium salt which is an example of the electrolyte salt, a material used in a general electrolytic solution for battery can be used. Specific examples of lithium salts include LiCl, LiBr, LiI, $LiClO_3$, $LiClO_4$, $LiBF_4$, $LiPF_6$, $LiNO_3$, $LiN(CF_3SO_2)_2$, $LiN(C_2F_5SO_2)_2$, $LiAsF_6$, $LiCF_3SO_3$, $LiC(SO_2CF_3)_3$, $LiAlCl_4$, and $LiSiF_6$, and, from the viewpoint of obtaining excellent stability to oxidation, $LiPF_6$ or $LiBF_4$ is desired. These lithium salts may be used individually or in combination. With respect to the lithium salt concentration, there is no particular limitation as long as the lithium salt can be dissolved in the above nonaqueous solvent, but it is preferred that the lithium ion concentration in the nonaqueous solvent is in the range of from 0.4 mol/kg to 2.0 mol/kg.

When using a gel electrolyte, the above electrolytic solution is used in the form of the electrolytic solution gelled with a matrix polymer. As the matrix polymer, there can be used any polymer which is compatible with a nonaqueous electrolytic solution composed of the above electrolyte salt dissolved in the nonaqueous solvent and which can be gelled. Examples of the matrix polymers include polymers composed of polyvinylidene fluoride, polyethylene oxide, polypropylene oxide, polyacrylonitrile, or polymethacrylonitrile in the repeating units. These polymers may be used individually or in combination.

Of these, an especially preferred matrix polymer is polyvinylidene fluoride or a copolymer of polyvinylidene fluoride with hexafluoropropylene in an amount of 7.5% or less. Such a polymer generally has a number average molecular weight in the range of from $5.0 \times 10^5$ to $7.0 \times 10^5$ (500,000 to 700,000) or a weight average molecular weight in the range of from $2.1 \times 10^5$ to $3.1 \times 10^5$ (210,000 to 310,000), and has an intrinsic viscosity in the range of from 1.7 to 2.1.

[Separator]

The separator is formed of a porous film composed of a polyolefin material, such as polypropylene (PP) or polyethylene (PE), or a porous film composed of an inorganic material, such as nonwoven fabric made of ceramic, and the separator may have a stacked structure having two or more types of the porous films. Especially, a polyethylene or polypropylene porous film is the most effective.

Generally, the usable separator preferably has a thickness of 5 μm to 50 μm, more preferably 7 μm to 30 μm. If the thickness of the separator is too large, the amount of the active material packed is reduced to lower the battery capacity, and further the ion conductivity is lowered, so that the current properties become poor. On the other hand, if the thickness of the separator is too small, the mechanical strength of the separator film is reduced.

[Fabrication of Battery]

The above-prepared gel electrolyte solution is uniformly applied to the positive electrode 11 and the negative electrode 12 so that the positive electrode active material layer and the negative electrode active material layer are individually impregnated with the gel electrolyte solution, followed by storage at room temperature or a drying step, forming a gel electrolyte layer 14. Then, the positive electrode 11, the separator 13a, the negative electrode 12, and the separator 13b are stacked in this order and spirally wound to form a battery device 10, using the positive electrode 11 and the negative electrode 12 having formed thereon the gel electrolyte layers 14. Subsequently, the battery device 10 is placed in the recess portion (space) 17a of the laminated film 17 and packaged to obtain a gel nonaqueous electrolyte secondary battery.

Next, the laminated film 17, which is the external packaging material for battery device according to one embodiment, is described in detail.

Figure 4:
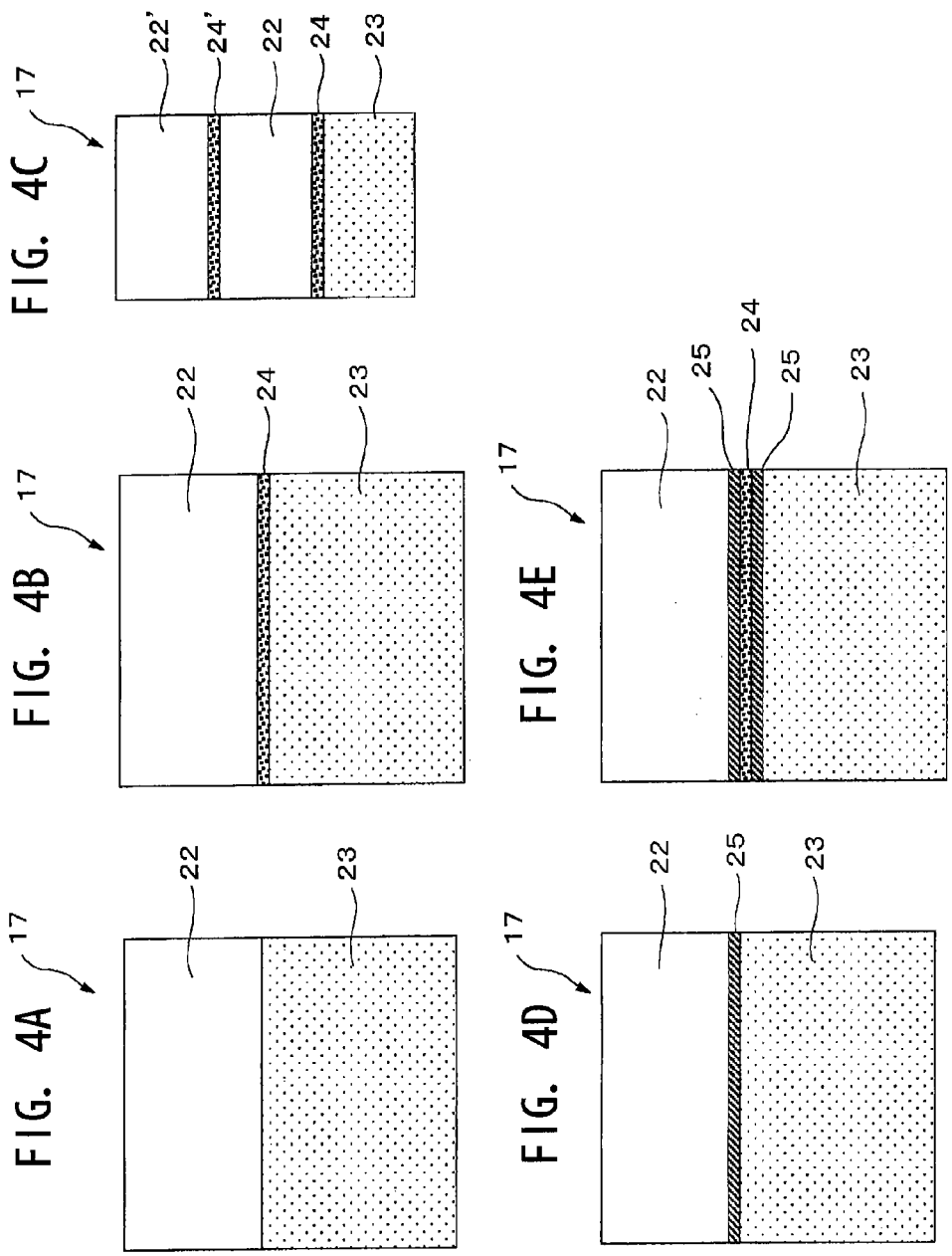
FIGS. 4A to 4E are cross-sectional views showing cross-sectional structures of examples of laminated films related to the external packaging material according to the embodiment.

FIGS. 4A to 4E are cross-sectional views showing the cross-sectional structures of laminated films 17. In FIG. 4A, the laminated film 17 includes an outer resin film layer 22 and an inner resin film layer 23 which are bonded together, and has a total thickness of about 60 μm. In this example, the outer resin film layer 22 corresponds to the outermost layer of the resin film and the inner resin film layer 23 corresponds to the innermost layer.

The outer resin layer 22 and the inner resin layer 23 can be bonded together using a bonding agent (bonding agent layer 24) having been used in the production of laminated film, e.g., a polyurethane, acrylic, or styrene bonding agent (see FIG. 4B). When the combination of the outer resin layer 22 and the inner resin layer 23 has heat-bonding properties, they can be bonded by passing the films of them through heated rollers (see FIG. 4A). Alternatively, they can be bonded by coating the outer resin film layer 22 in the form of a film with the inner resin film layer 23 which is molten or diluted with a solvent by extrusion or the like.

In the example shown in FIG. 4A, for preventing moisture from diffusing from the surface (upper surface) of the outer resin film layer 22 and the end surface (sidewall) of the laminated film 17 into the resins and penetrating the battery device, a moisture absorbing material (not shown) having high affinity with water, such as a sulfate salt or polyacrylate, is mixed into the inner resin film layer 23.

In the example shown in FIG. 4A, a moisture absorbing material is added to the inner resin film layer 23, but, in the present invention, the moisture absorbing material may be either contained in the outer resin film layer 22 or contained in both the inner resin film layer 23 and the outer resin film layer 22 as long as moisture does not go into the inside of the battery device, that is, moisture does not penetrate the bottom surface (inner surface) of the laminated film 17. For preventing moisture penetration for a long term using the moisture absorbing material, it is preferred that the moisture absorbing material is contained in the inner resin film layer 23, and, in a case where the resin film has a plurality of layers, it is desired that the moisture absorbing material is contained in an inner layer or layers in the resin film. In the example shown in FIG. 4B in which the laminated film has the bonding agent layer 24, the moisture absorbing material may be either contained in any one of the outer resin film layer 22, bonding agent layer 24, and inner resin film layer 23 or contained in two or more arbitrary layers selected from them. In a case where a plurality of resin layers or bonding agent layers are present, to preferentially incorporate the moisture absorbing material into an inner layer in the resin or bonding agent layers is effective, and, if the moisture absorbing material is incorporated into the two or more layers, the long-lasting effect of the moisture absorbing material can be obtained.

As an example of the moisture absorbing material, there can be mentioned at least one inorganic compound selected from the group consisting of an oxide, a chloride, a sulfate, and a nitrate of sodium, potassium, magnesium, or calcium, at least one polyacrylate represented by the following general formula (2):

$$(—CH_2—CH(COOM)-)_n \tag{2}$$

where M represents sodium, potassium, magnesium, or calcium, and n represents a natural number of 100 to 5,000, or a mixture thereof.

Specific examples of the moisture absorbing materials include sodium sulfate, magnesium sulfate, calcium oxide, calcium chloride, magnesium chloride, sodium nitrate, the above polyacrylate, and mixtures thereof.

With respect to the amount of the moisture absorbing material added, there is no particular limitation as long as the moisture penetration can be prevented, but it is preferred that the moisture absorbing material is added in an amount of 0.1% to 45%, based on the mass of the resin film layer or bonding agent layer containing the moisture absorbing material. If the amount of the moisture absorbing material added is less than 0.1%, the moisture penetration may be unsatisfactorily prevented. On the other hand, if the amount is more than 45%, the moisture absorbing material content is too large, thereby lowering the adhesion or flexibility of the film, or making it difficult to form a film due to cracking.

In the present invention, the laminated film can be formed by stacking two or more, for example, three resin film layers and a plurality of bonding agent layers (see FIG. 4C). In the example shown in FIG. 4C, the inner resin film layer 23 and the outer resin film layers 22, 22' are stacked with the bonding agent layers 24, 24' disposed in between to form a laminated film of a three-layer structure with bonding agent layers. As mentioned above, it is sufficient if the moisture absorbing material is contained in at least one layer in the resin film layers 22, 22', 23, 23' and the bonding agent layers 24, 24'. In a case where the laminated film has a plurality of resin film layers, it is preferred that the moisture absorbing material is contained in the inner layer 22 or 23 other than the outermost layer 22', and, with respect to the bonding agent layer, it is desired that the moisture absorbing material is contained in the inner bonding agent layer 24.

Further, in the embodiment, as shown in FIG. 4D, a barrier layer 25 composed of an aluminum deposited film, a carbon deposited film, a silicon oxide deposited film, an aluminum oxide deposited film, a polyvinylidene chloride coating film, a layer silicate film, or a combination thereof can be formed between the outer resin film layer 22 and the inner resin film layer 23, for example, on at least one of the bottom surface (lower surface) of the outer resin film layer 22 and the upper surface of the inner resin film layer 23. With this arrangement, it is possible to suppress deterioration of the moisture absorbing ability of the moisture absorbing material, thus improving the moisture penetration prevention properties. A similar effect can be obtained in the laminated film 17 having the bonding agent layer 24 (see FIG. 4E), and, further in the laminated film having three resin film layers or more as shown in FIG. 4C, a similar effect can be obtained. In the example shown in FIG. 4C, the aluminum deposited film or the like may be formed between the resin film layers 22 and 22' and between the resin film layers 22 and 23.

In the example shown in FIG. 4A, the moisture absorbing material is contained and therefore, the larger the thickness of the inner resin film layer 23, the larger the amount of moisture absorbed by the layer, that is, the more excellent the moisture penetration prevention effect. However, from the viewpoint of increasing the battery capacity of a battery produced using the laminated film 17, the laminated film having a large thickness is not preferred. In this embodiment, when the inner resin film layer 23 has a thickness in the range of from 10 to 50 µm, both excellent adhesion between the outer resin film layer 22 and the inner resin film layer 23 and excellent moisture penetration prevention effect can be achieved.

For maintaining the moisture absorbing ability for a long term, it is advantageous that the amount of moisture which penetrates the outer resin film layer 22 is as small as possible, and the outer resin film layer having a larger thickness improves the effect, but, as mentioned above, the laminated film having a large thickness is not preferred from the viewpoint of increasing the battery capacity. Therefore, it is desired that the outer resin film layer 22 is coated with a resin having low moisture permeability or a layer having high moisture barrier properties.

Specific examples include films composed mainly of oriented nylon, oriented polyethylene terephthalate, oriented polyethylene naphthalate, oriented polybutylene terephthalate, oriented polybutylene naphthalate, oriented polypropylene, oriented polyethylene, oriented polyacrylonitrile, polyvinyl chloride, polyvinylidene chloride, polyvinylidene chloride-coated cellophane, a polyamide resin such as 6-nylon, a polyester resin such as PET, polyimide, polyphenylene ether, polysulfone, or a mixed resin of the above two or more resins. In addition thereto, a fluororesin such as polychlorotrifluoroethylene (PCTFE) or polytetrafluoroethylene (PTFE), polyvinylidene chloride, a polyvinyl alcohol resin, an amorphous resin such as amorphous cycloolefin, a resin having a surface or the like coated (K coat) with polyvinylidene chloride or a polyvinyl alcohol resin, a resin having a surface or the like deposited or coated with $Si_xO_y$, $Al_xO_y$, or thin film ceramic, or a resin obtained by adding a thermosetting resin to a layer silicate can be used.

On the other hand, it is desired that the inner resin film layer 23 itself is formed from a material having low moisture permeability, and specific examples of the materials include films or hot-melt layers composed mainly of casted polyethylene, casted polypropylene, a casted ethylene-vinyl acetate copolymer, a casted ethylene-acetic acid-vinyl alcohol copolymer, a casted ethylene-acrylic acid copolymer, a casted ethylene-ethyl acrylate copolymer, a casted ethylene-methyl acrylate copolymer, a casted ethylene-methacrylic acid copolymer, a casted ethylene-methyl methacrylate copolymer, a casted ionomer, casted polyacrylonitrile, casted polyethylene terephthalate, a fluororesin such as PCTFE or PTFE, polyvinylidene chloride, a polyvinyl alcohol resin, an amorphous resin such as amorphous cycloolefin, a resin having a surface or the like coated (K coat) with polyvinylidene chloride or a polyvinyl alcohol resin, a resin having a surface or the like deposited or coated with $Si_xO_y$, $Al_xO_y$ or thin film ceramic, a polyolefin resin such as modified PP or modified PE, polystyrene, a carboxylic resin, an ionomer resin, or an arbitrary mixed resin thereof.

From the viewpoint of facilitating heat sealing, it is desired that the outer resin film layer 22 is not melted by heating for the sealer, while it is desired that the inner resin film layer 23 is rapidly melted by the heating. Therefore, the sealing is preferably facilitated by using resins having different fluidities or adhesions, for example, using a combination of the inner resin film layer 23 and the outer resin film layer 22 composed of a material having a melting temperature higher than that of the inner resin film layer, or using a combination of the inner resin film layer 23 composed of a casted film and the outer resin film layer 22 comprised of an oriented film in a case of films made of the same material.

As a representative example of a laminated film of a three-layer structure, there can be mentioned a laminated film composed of an inner resin film layer having a sealant function, a medium resin film layer having a low moisture vapor permeability, and an outer resin film layer having high heat resistance and chemical resistance and having a melting temperature higher than that of the inner resin film layer, which layers are stacked in this order.

In this case, examples of sealant resins constituting the inner resin film layer include polyolefin resins, such as casted polypropylene, casted polyethylene, modified polypropylene, and modified polyethylene; polystyrene; ethylene-acrylic acid (EAA) copolymers; ethylene-methacrylic acid copolymers; carboxylic resins; and ionomer resins. Examples of low moisture-permeable resins constituting the medium resin film layer include fluororesins such as PCTFE and PTFE, polyvinylidene chloride, polyvinyl alcohol resins, amorphous resins such as amorphous cycloolefin, resins having a surface or the like coated (K coat) with polyvinylidene chloride or a polyvinyl alcohol resin, and resins having a surface or the like deposited or coated with $Si_xO_y$, $Al_xO_y$, or thin film ceramic. Examples of heat resistant and chemical resistant resins constituting the outer resin film layer include polyamide resins such as 6-nylon, polyester resins such as PET, oriented polypropylene, oriented polyethylene, polyimide, polyphenylene ether, and polysulfone.

With respect to the above-described typical example of the external packaging material for battery device of the embodiment, the structures and materials are summarized in Tables 1-1 to 1-5 below.

TABLE 1-1

| Outer resin |
| --- |
| Low moisture permeable and heat resistant |
| Oriented nylon (polyamide) |
| Oriented polyethylene terephthalate (polyester) |
| Oriented polyethylene naphthalate (polyester) |
| Oriented polybutylene terephthalate (polyester) |
| Oriented polybutylene naphthalate (polyester) |
| Oriented polyethylene (polyolefin) |
| Oriented polypropylene (polyolefin) |
| Polyacrylonitrile |
| Polyvinylidene chloride |
| Polytetrafluoroethylene |
| Polychlorotrifluoroethylene |
| Polyphenylene ether |
| Polysulfone |
| Polyimide |
| Film formed from layer silicate containing thermosetting resin |
| The film having polyvinylidene chloride coated on device side |
| The film having silicon oxide deposited on device side |
| The film having carbon deposited on device side |
| The film having aluminum oxide deposited on device side |
| The film having aluminum deposited on device side |

TABLE 1-2

| + Bonding agent |
| --- |
| Generally used |

Acrylic
Polyurethane
Polystyrene
Polyolefin
Polyester
Another one having resistance to electrolytic solution
None (medium layer is applied by coating method)

TABLE 1-3

| Medium layer |
| --- |
| Low moisture permeable |

Polytetrafluoroethylene
Polychlorotrifluoroethylene
Polyvinylidene chloride
Resin containing carnauba wax
Resin containing paraffin wax
Film formed from layer silicate containing thermosetting resin
Cycloolefin
Casted polyethylene
Casted polypropylene
Casted ethylene-vinyl acetate copolymer
Casted ethylene-acetic acid-vinyl alcohol copolymer
Casted ethylene-ethyl acrylate copolymer
Casted ethylene-methyl acrylate copolymer
Casted ethylene-methyl methacrylate copolymer
Casted polyacrylonitrile
Casted polyethylene terephthalate
Casted maleic anhydride-modified polypropylene
Casted maleic anhydride-modified polyethylene
Casted ethylene-acrylic acid copolymer
Casted ethylene-methacrylic acid copolymer
Casted ethylene-vinyl acetate copolymer
Casted polyethylene containing titanate coupling agent
Casted polypropylene containing titanate coupling agent
Casted ionomer
The film having polyvinylidene chloride coated on air side
The film having silicon oxide deposited on air side
The film having carbon deposited on air side
The film having aluminum oxide deposited on air side
The film having aluminum deposited on air side

TABLE 1-4

| (+Bonding agent layer) |
| --- |
| Inner layer |
| Low moisture permeable and sealing |

Sealing, low moisture permeable
Casted polyethylene
Casted polypropylene
Casted ethylene-vinyl acetate copolymer
Casted ethylene-acetic acid-vinyl alcohol copolymer
Casted ethylene-ethyl acrylate copolymer
Casted ethylene-methyl acrylate copolymer
Casted ethylene-methyl methacrylate copolymer
Casted polyacrylonitrile
Casted polyethylene terephthalate
Sealable directly to metal lead, low moisture permeable
Casted maleic anhydride-modified polypropylene
Casted maleic anhydride-modified polyethylene
Casted ethylene-acrylic acid copolymer
Casted ethylene-methacrylic acid copolymer
Casted ethylene-vinyl acetate copolymer
Casted polyethylene containing titanate coupling agent
Casted polypropylene containing titanate coupling agent
Casted ionomer TABLE 1-4-continued

| (+Bonding agent layer) |
| --- |
| Inner layer |
| Low moisture permeable and sealing |

The film having polyvinylidene chloride coated on air side
The film having silicon oxide deposited on air side
The film having carbon deposited on air side
The film having aluminum deposited on air side
The film having aluminum oxide deposited on air side

TABLE 1-5

| Moisture absorbing material (effective when added to inner layer in resin layers or bonding agent layers) |
| --- |

Sodium sulfate
Magnesium sulfate
Calcium oxide
Calcium chloride
Magnesium chloride
Sodium nitrate
Sodium polyacrylate
Potassium polyacrylate
Magnesium polyacrylate
Calcium polyacrylate In the present embodiments, the resin materials and moisture absorbing materials shown in Tables 1-1 to 1-5 above can be arbitrarily selected and used in combination. Any materials having similar properties, which are not shown in Table 1 above, can be used. As seen in Tables 1-1 to 1-5, in the external packaging material for battery device of the embodiment, it is desirable that any resin layers have relatively low moisture permeability. In addition, it is desired that the moisture absorbing material is preferentially incorporated into a layer nearer the battery device, and to incorporate the moisture absorbing material into a layer inside the layer having moisture barrier properties, namely, a layer disposed on the battery device side is efficient.

With respect to the external packaging material for battery device having a three-layer structure, desired properties and materials are described below.

(A) Outer Resin Layer

A resin having a heat resistance is preferred, specifically, an oriented film is desired. When a deposited film is formed on the outer resin layer, it is preferred that the deposited film is formed on the electrode element side for protection.

(B) Medium Resin Layer

A resin layer having high moisture barrier properties is preferred, and specific examples include:

(i) a single film (an oriented film is preferred from the viewpoint of achieving excellent barrier properties);

(ii) a hot melt applied to the surface of the outer layer or inner layer;

(iii) a layer co-extruded upon forming the outer layer or inner layer; and (iv) a layer extruded between the outer layer and the inner layer.

When the moisture absorbing material is mixed and barrier properties are imparted to the layer, it is preferred that a film having barrier properties is arranged on the air side (outside).

(C) Inner Resin Layer

A resin having sealing properties is preferred, and specific examples include:

(i) a single film (a casted film is preferred from the viewpoint of achieving excellent sealing properties);

(ii) a hot melt applied to the surface of the medium layer; and (iii) a layer co-extruded upon forming the medium layer.

When the moisture absorbing material is mixed and barrier properties are imparted to the layer, it is preferred that a film having barrier properties is arranged on the air side (outside).

In the current situation, the most preferred construction of the external packaging material includes an outer resin layer which is composed of oriented polypropylene coated with polyvinylidene chloride and further coated with an aluminum oxide deposited film (thickness: about 30 µm), and an inner resin layer which is composed of casted polypropylene coated with polyvinylidene chloride and further coated with an aluminum oxide deposited film, and which contains magnesium sulfate in an amount of 10%, based on the mass of the layer (thickness: about 30 µm), in which the outer resin layer and the inner resin layer are bonded together through a polystyrene bonding agent.

Figure 5:
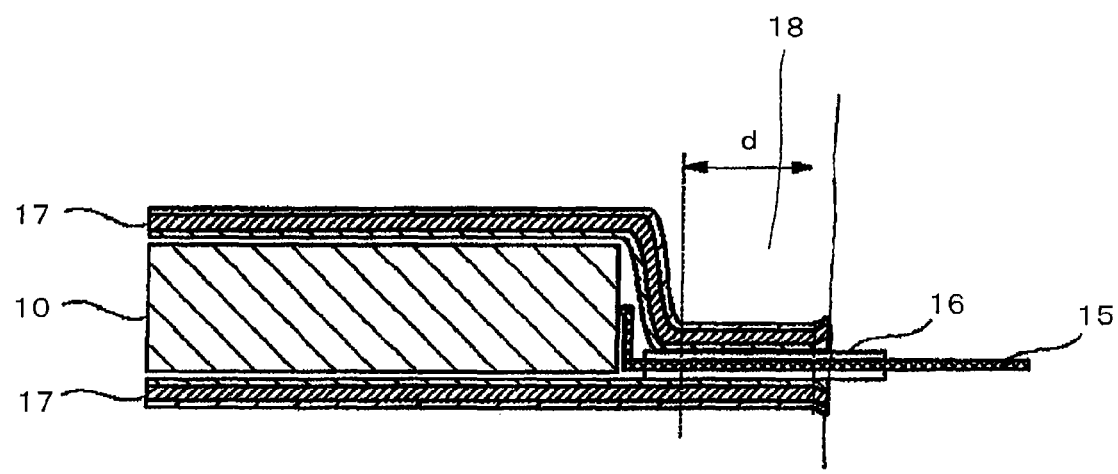
FIG. 5 is a partially cross-sectional view showing a portion near an electrode lead-out portion in the nonaqueous electrolyte secondary battery according to one embodiment.

In the present embodiment, as shown in FIGS. 2 and 3, the battery device 10 is covered with the above-described laminated film 17, and the laminated film is sealed around the battery device 10 to form a nonaqueous electrolyte secondary battery 20. As shown in FIG. 5, in sealing the laminated film around the battery device, for preventing moisture penetration, a sealed width d at an electrode lead-out portion 18 through which the positive electrode terminal 15a and negative electrode terminal 15b are electrically introduced is more than 3.5 mm in the related arts. By contrast, in the present embodiment, the inner resin film layer 23 contains the moisture absorbing material, and therefore the sealed width (top sealed width) can be smaller than that width. Specifically, the sealed width d can be as small as 0.5 mm to 3.5 mm, and thus the resultant battery has an increased capacity. It is desired that an excess film portion or squeezed out portion caused during the sealing is removed by trimming or the like to render the outer size uniform and contamination due to the excess resin is prevented. Such trimming also contributes to the increase of the battery capacity.

The sealed width means a width of the portion of the inner resin film layer 23 sealed together by actually heating (see FIG. 5). In a related art battery using a metallic foil laminated film in the external packaging, when cutting the laminated film into a piece of a predetermined size, it is likely that a cut fin is formed at the end of the laminated film and short-circuiting occurs between the cut fin and the electrode terminal 15, and therefore a sealant 16 for insulation is disposed. In the embodiment, the laminated film as an external packaging material contains no metallic foil, and hence there is no fear that short-circuiting occurs, and the external packaging material can be of a structure using no sealant 16. In addition, there is no fear of short-circuiting and therefore strong sealing is possible, thus lowering the leakage rate. Further, the structure using no metallic foil is very effective in preventing pinhole formation during shaping of the external packaging material.

When using this structure, it is desired that at least the whole of the sealed portion of the laminated film and the electrode terminal, namely, at least the whole of the electrode lead-out portion 18, typically the inner resin film layer 23 corresponding to the innermost layer is composed of a resin film which can be heat-bonded to a metal, such as casted polyethylene, casted maleic anhydride-modified polyethylene, casted polypropylene, casted maleic anhydride-modified polypropylene, casted polyethylene containing a titanate coupling agent, casted polypropylene containing a titanate coupling agent, a casted ionomer, a casted ethylene-acrylic acid copolymer, a casted ethylene-methacrylic acid copolymer, a casted ethylene-vinyl acetate copolymer, a casted ethylene-acetic acid-vinyl alcohol copolymer, casted polyacrylonitrile, casted polyethylene terephthalate, or a mixture thereof.

The structure using no sealant can also be achieved by preliminarily subjecting the surface of the electrode terminal 15 to primer treatment for roughing the surface, such as plasma treatment, chemical conversion treatment, chromate treatment, sandblasting, or anodized aluminum treatment.

Figure 6A:
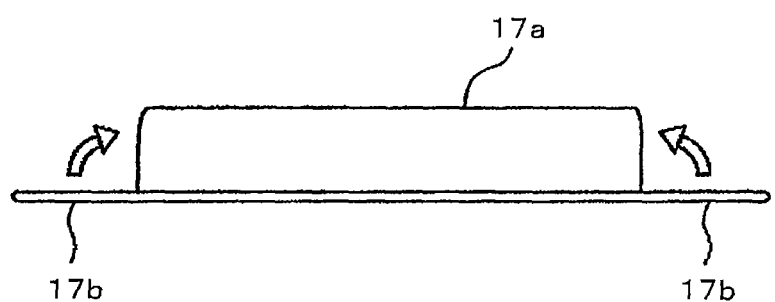
FIGS. 6A and 6B are end views showing a portion near a sidewall in the nonaqueous electrolyte secondary battery according to the embodiment.
Figure 6B:
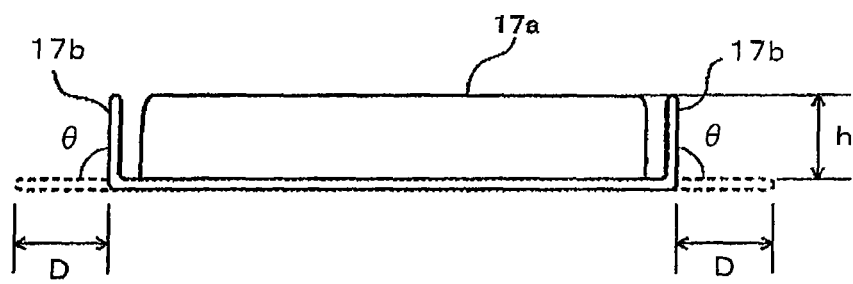

The battery device 10 is covered with the external packaging material and the packaging material is sealed as mentioned above and then, as shown in FIGS. 6A and 6B, portions (hereinafter, frequently referred to as "side sealed portions") 17b on both sides of a recess portion 17a containing the battery device 10 are bent in the direction of the recess portion 17a. It is preferred that the bent angle θ is in the range of from 80° to 100°. In a case of the bent angle being less than 80°, the distance between the ends of the sidewalls 17b formed on both sides of the recess portion 17a is too large, that is, the width of the nonaqueous electrolyte secondary battery 20 is too large, making it difficult to miniaturize the nonaqueous electrolyte secondary battery 20 or improve the battery capacity. The upper limit 100° is determined depending on the shape of the recess portion 17a, and, in a case where the recess portion contains the battery device 10 of a flat type, the upper limit of the bent angle is about 100°. The heat-sealed width at the side sealed portion 17b preferably is 0.5 mm to 2.5 mm, more preferably 1.5 mm to 2.5 mm.

For miniaturizing the nonaqueous electrolyte secondary battery 20 and improving the battery capacity, it is preferred that the bent width D of the side portion 17b is equal to or smaller than the height h of the recess portion 17a or the thickness of the battery device 10. Further, for miniaturizing the nonaqueous electrolyte secondary battery 20 and improving the battery capacity, it is preferred that the side portion is bent once.

In the above embodiment, the nonaqueous electrolyte secondary battery 20 using a gel electrolyte is described, but the present invention can be applied to a battery covered with a laminated film using an electrolytic solution. In this case, the step for applying a gel electrolyte to the surface of each of the positive electrode and the negative electrode in the above embodiment is omitted, and a step for charging an electrolytic solution is provided in the step for sealing the laminated film. More specifically, three sides of the laminated film around the battery device 10 having a rectangular plate shape are sealed, and then an electrolytic solution is charged through an opening of the remaining one side, followed by sealing of the remaining side. In this case, the sealed portions collectively have a rectangular frame form.

In the present embodiments, means for detecting leakage of the nonaqueous electrolytic solution can be provided in the resin film layer constituting the laminated film 17, preferably in the outermost layer. The leakage detecting means can be formed by printing on the surface of the resin film a dye that develops color due to contact with the nonaqueous electrolytic solution, or by coating microcapsules filled with a dye, which are broken under a predetermined pressure.

As mentioned above, in the present embodiment, moisture is prevented from penetrating the battery through the surface layer or the cross-section of the sealed portion of the laminated film comprised of a resin having no metallic foil, so that gas generation within the battery can be suppressed, thus preventing the occurrence of battery expansion. Further, in this case, a metallic foil of Al or the like is not used, and hence the total thickness of the laminated film can be reduced or the sealed width can be reduced, thus making it possible to improve the capacity of a nonaqueous electrolyte secondary battery or battery pack containing a battery device having a larger volume relative to a predetermined size.

In the present embodiments, the battery pack can be produced by placing, for example, the nonaqueous electrolyte secondary battery according to the above embodiment, and a wiring board having a protection circuit for electrically protecting the battery and a connection terminal for connecting the battery with an electric device in an appropriate casing. In this case, it is preferred to dispose the wiring board on the sealed portion of the electrode lead-out portion of the laminated film so that the wiring board, particularly its end does not protrude from the end of the sealed portion.

EXAMPLES

Hereinbelow, the present embodiments are described in more detail with reference to the following Examples and Comparative Examples. Specifically, a battery device having the above-described structure and a nonaqueous electrolyte secondary battery using the same are prepared and evaluated in respect of their performance.

[Preparation of Positive Electrode]

92% of lithium cobaltite ($LiCoO_2$), 3% of powdery polyvinylidene fluoride, and 5% of powdery graphite were uniformly mixed with each other, and dispersed in N-methylpyrrolidone to prepare a positive electrode composition in a slurry state. The positive electrode composition prepared was uniformly applied to both sides of an Al foil as a current collector for positive electrode, and dried under a reduced pressure at 100° C. for 24 hours to form a positive electrode active material layer.

Then, the resultant foil was pressed by means of a roll pressing machine to form a positive electrode sheet, and the positive electrode sheet was cut into a strip to obtain a positive electrode, and an Al ribbon lead was welded to the active material unapplied portion of the positive electrode. A polypropylene leaf was bonded to both sides of the portion of the lead to be sandwiched between aluminum laminated films.

[Preparation of Negative Electrode]

91% of artificial graphite and 9% of powdery polyvinylidene fluoride were uniformly mixed with each other, and dispersed in N-methylpyrrolidone to prepare a negative electrode composition in a slurry state. Then, the negative electrode composition prepared was uniformly applied to both sides of a copper foil as a current collector for negative electrode, and dried under a reduced pressure at 120° C. for 24 hours to form a negative electrode active material layer.

Then, the resultant foil was pressed by means of a roll pressing machine to form a negative electrode sheet, and the negative electrode sheet was cut into a strip to obtain a negative electrode, and an Ni ribbon lead was welded to the active material unapplied portion of the negative electrode. A polypropylene leaf was bonded to both sides of the portion of the lead to be sandwiched between aluminum laminated films.

[Preparation of Gel Electrolyte]

Polyvinylidene fluoride copolymerized with hexafluoropropylene in an amount of 6.9%, a nonaqueous electrolytic solution, and dimethyl carbonate (DMC) as a diluent solvent were mixed with each other and dissolved by stirring to obtain a sol electrolyte solution. The electrolytic solution was prepared by mixing together ethylene carbonate and propylene carbonate in a weight ratio of 6:4, and dissolving 0.8 mol/kg of $LiPF_6$ and 0.2 mol/kg of $LiBF_4$ in the mixed solvent. The weight ratio of the components in the electrolyte solution was polyvinylidene fluoride:electrolytic solution:DMC=1:6:12. Subsequently, the sol electrolyte solution obtained was uniformly applied to both sides of each of the positive electrode and the negative electrode. Then, the sol electrolyte solution applied was dried at 50° C. for 3 minutes to remove the solvents, thus forming gel electrolyte layers on both sides of each of the positive electrode and the negative electrode.

Next, the strip positive electrode having the gel electrolyte layers formed on both sides and the strip negative electrode having the gel electrolyte layers formed on both sides were spirally wound in the longitudinal direction with a separator disposed in between to obtain a battery device. As the separator, a porous polyethylene film having a thickness of 10 μm and a porosity of 33% was used.

[Fabrication of Battery]

The thus prepared battery device was individually covered with the external packaging materials composed of different laminated films shown in Tables 2-1 to 3-2 below, and the external packaging materials were individually sealed around the battery device with different sealed widths (0.5 mm to 3.5 mm) to prepare test batteries in Examples each having a thickness of 3 mm. In this instance, the test batteries in Examples were prepared so that the sealed widths were different but the outer size was constant.

Shaping of the external packaging material was conducted by vacuum molding using a mold. With respect to the aluminum laminated film, it is hardly possible to conduct shaping with a depth of 12 mm. Sealing was conducted using a bar sealer of a both-side heating type. The bar sealer used was of a type having one surface coated with a rubber. In a case where a metal bonding resin was used in the inner layer in the external packaging material, the resin leaf disposed around the terminal was omitted. Side sealing was conducted by bending once the side portion. In a case where no aluminum deposited layer was formed, microcapsules were applied to the inner surface or entire surface of the sealed portion to easily visually check a defect caused without a pressure.

With respect to each of the test batteries obtained (height: 50 mm×width: 34 mm×thickness: 12 mm), a constant current and constant voltage charge at 2,400 mA and 4.35 V was conducted for one hour. Then, a constant current discharge at 800 mA was conducted until the battery voltage had reached 3.7 V.

Examples 1-1 to 1-7, Examples 2 to 12, and Comparative Examples 1 and 2

The operations mentioned above were performed to obtain batteries in Examples having the materials or structures shown in Tables 2-1 to 3-2 below.

With respect to each of the batteries in Examples, the following performance evaluations were conducted, and the results are shown in Table 4 below.

[Short-Circuiting]

The battery was checked whether short-circuiting occurred between the terminal and the external packaging material.

[Pinhole]

The external packaging material was checked whether a pinhole or breakage was caused during the molding.

[Expansion]

The battery was checked how long (in terms of day) it takes to cause expansion of 0.5 mm or more relative to the battery thickness.

[Capacity]

With respect to the battery which had been stored for one year, a capacity was measured.

TABLE 2-1

Conditions in Examples

| | Outer layer | Bonding agent | Medium layer | Bonding agent | Inner layer | Film for terminal | Top sealed width |
|---|---|---|---|---|---|---|---|
| Example 1-1 | Oriented polypropylene (30 μm) | None | None | Polystyrene | (30 μm) Casted maleic acid-modified polyethylene containing 10% magnesium sulfate | None | 1.5 mm |
| Example 2 3-Layer | Oriented polypropylene (30 μm) | Polystyrene | Polyvinylidene chloride (20 μm) | Polystyrene | (30 μm) Casted maleic acid-modified polyethylene containing 10% magnesium sulfate | None | 1.5 mm |
| Example 3 3-Layer with no bonding agent | Oriented polypropylene (30 μm) | Polystyrene | Polyvinylidene chloride coat(5 μm) | None | (30 μm) Casted maleic acid-modified polyethylene containing 10% magnesium sulfate | None | 1.5 mm |
| Example 4 Added to multiple layers | Oriented polypropylene (30 μm) | Polystyrene | Polyvinylidene chloride (20 μm) containing 10% magnesium sulfate | Polystyrene | (30 μm) Casted maleic acid-modified polyethylene containing 10% magnesium sulfate | None | 1.5 mm |
| Example 5 Added to bonding agent | Oriented polypropylene (30 μm) | None | None | Polystyrene containing 10% magnesium sulfate | Casted maleic acid-modified polyethylene (30 μm) | None | 1.5 mm |
| Example 6 Added to multiple bonding agent layers | Oriented polypropylene (30 μm) | Polystyrene containing 10% magnesium sulfate | Polyvinylidene chloride (20 μm) | Polystyrene containing 10% magnesium sulfate | Casted maleic acid-modified polyethylene (30 μm) | None | 1.5 mm |

TABLE 2-2

Conditions in Examples

| | Outer layer | Bonding agent | Medium layer | Bonding agent | Inner layer | Film for terminal | Top sealed width |
|---|---|---|---|---|---|---|---|
| Example 7 Deposited film | Oriented polypropylene (30 μm) | None | None | Polystyrene | (30 μm) Casted maleic acid-modified polyethylene containing 10% magnesium sulfate and having silicon oxide deposited on air side | None | 1.5 mm |
| Example 8 Multiple deposited films | Oriented polypropylene having silicon oxide deposited on device side (30 μm) | None | None | Polystyrene | (30 μm) Casted maleic acid-modified polyethylene containing 10% magnesium sulfate and having silicon oxide deposited on air side | None | 1.5 mm |
| Example 9 Composite | Oriented polpropylene (30 μm) | None | Polyvinylidene chloride coat (5 μm) on device side, silicon oxide further deposited | Polystyrene containing 10% magnesium sulfate | (30 μm) Casted maleic acid-modified polyethylene containing 10% magnesium sulfate | None | 1.5 mm |
| Example 10 Moisture permeable resin | Vinylon (30 μm) | None | None | Polystyrene | (30 μm) Casted maleic acid-modified polyethylene containing 10% magnesium sulfate | None | 1.5 mm |
| Example 11 Bonding agent added position | Oriented polypropylene (30 μm) | Polystyrene | Polyvinylidene chloride (20 μm) | Polystyrene containing 10% magnesium sulfate | Casted maleic acid-modified polyethylene (30 μm) | None | 1.5 mm |
| Example 12 3-Layer + Bonding agent | Oriented polypropylene (30 μm) | Polystyrene containing 10% magnesium sulfate | Polyvinylidene chloride (20 μm) | Polystyrene | Casted maleic acid-modified polyethylene (30 μm) | None | 1.5 mm |

TABLE 3-1

Conditions in Examples

| | Outer layer | Bonding agent | Medium layer | Bonding agent | Inner layer | Film for terminal | Top sealed width |
|---|---|---|---|---|---|---|---|
| Example 1-2 Film for terminal | Oriented polypropylene (30 μm) | None | None | Polystyrene | (30 μm) Casted polyethylene containing 0.1% magnesium sulfate (30 μm) | Applied | 1.5 mm |
| Example 1-3 Sealed width changed | Oriented polyproplene (30 μm) | None | None | Polystyrene | (30 μm) Casted maleic acid-modified polyethylene containing 10% magnesium sulfate | None | 0.5 mm |
| Example 1-4 Sealed width changed | Oriented polypropylene (30 μm) | None | None | Polystyrene | (30 μm) Casted maleic acid-modified polyethylene containing 10% magnesium sulfate | None | 2.5 mm |
| Example 1-5 Sealed width changed | Oriented polypropylene (30 μm) | None | None | Polystyrene | (30 μm) Casted maleic acid-modified polyethylene containing 10% magnesium sulfate | None | 3.5 mm |
| Example 1-6 Added amount changed | Oriented polypropylene (30 μm) | None | None | Polystyrene | (30 μm) Casted maleic acid-modified polyethylene containing 0.1% magnesium sulfate | None | 1.5 mm |
| Example 1-7 Added amount changed | Oriented polypropylene (30 μm) | None | None | Polystyrene | (30 μm) Casted maleic acid-modified polyethylene containing 45% magnesium sulfate | None | 1.5 mm |
| Example 1-8 Added amount changed | Oriented polypropylene (30 μm) | None | None | Polystyrene | (30 μm) Casted maleic acid-modified polyethylene containing 50% magnesium sulfate | None | 1.5 mm |

TABLE 3-2

Conditions in Examples

| | Outer layer | Bonding agent | Medium layer | Bonding agent | Inner layer | Film for terminal | Top sealed width |
|---|---|---|---|---|---|---|---|
| Comparative Example 1 Aluminum contained | Oriented polypropylene (30 μm) | Polystyrene | 40 μm Aluminum foil | Polystyrene | (30 μm) Casted maleic acid-modified polyethylene containing no absorbing material | None | 1.5 mm |
| Comparative Example 2 No aluminum | Oriented polypropylene (30 μm) | None | None | Polystyrene | (30 μm) Casted maleic acid-modified polyethylene containing no absorbing material | None | 1.5 mm |

TABLE 4

| | Short-circuiting | Pinhole | Expansion | Capacity (mAh) |
|---|---|---|---|---|
| Example 1-1 | None | None | 478 Days | 2,412 |
| Example 2 3-Layer | None | None | 689 Days | 2,393 |
| Example 3 3-Layer with no bonding agent | None | None | 523 Days | 2,410 |
| Example 4 Added to multiple layers | None | None | 756 Days | 2,392 |
| Example 5 Added to bonding agent | None | None | 366 Days | 2,412 |
| Example 6 Added to multiple bonding agent layers | None | None | 512 Days | 2,392 |
| Example 7 Deposited film | None | None | More than 890 days | 2,415 |
| Example 8 Multiple deposited films | None | None | More than 1,000 | 2,411 |
| Example 9 Composite | None | None | More than 1,000 days | 2,410 |
| Example 10 Moisture permeable resin | None | None | 298 Days | 2,201 |
| Example 11 Bonding agent added position | None | None | 536 Days | 2,389 |
| Example 12 3-Layer + Bonding agent | None | None | 426 Days | 2,390 |
| Example 1-2 Film for terminal | None | None | More than 1,000 days | 2,410 |
| Example 1-3 Sealed width changed | None | None | 371 Days | 2,467 |

TABLE 4-continued

|  | Short-circuiting | Pinhole | Expansion | Capacity (mAh) |
|---|---|---|---|---|
| Example 1-4 Sealed width changed | None | None | 499 Days | 2,353 |
| Example 1-5 Sealed width changed | None | None | 582 Days | 2,295 |
| Example 1-6 Added amount changed | None | None | 361 Days | 2,408 |
| Example 1-7 Added amount changed | None | None | More than 1,000 days | 2,410 |
| Example 1-8 Added amount changed | None | None | 381 Days | 2,414 |
| Comparative Example 1 Aluminum contained | None | Caused | 4 Hours | 0 (Initial: 2,301) |
| Comparative Example 2 No aluminum | None | None | 1 Hour | 0 (Initial: 2,411) |

As is apparent from Tables 2-1 to 4 above, in Examples 1 to 12, external packaging materials having various layer structures can be obtained. For example, external packaging materials of a two-layer or three-layer structure can be obtained, and the layer into which an additive, such as a moisture absorbing material or a deposited layer, is incorporated can be appropriately changed. Further, in these Examples, no aluminum foil is present and therefore deep drawing can be made, and no pinhole is caused. It is also found that the sealing causes no short-circuiting between the external packaging material and the terminal, and moisture is unlikely to penetrate the battery and no battery expansion occurs in about one year or longer.

Example 2 is directed to an external packaging material of a three-layer structure, and no battery expansion occurs and the battery life is extended, but the thickness is larger than that of a two-layer structure and hence the battery capacity tends to lower.

As can be seen from Example 3, the external packaging material can be of a three-layer structure having a coated barrier layer. In this case, no battery expansion occurs and the life is extended, and the battery thickness is not increased.

As can be seen from Example 4, a moisture absorbing material can be added to two layers or more. Also in this case, no battery expansion occurs and the battery life is extended, but the thickness is increased and hence the battery capacity tends to lower.

Example 5 shows that a moisture absorbing material can be added to the bonding agent. Also in this case, no aluminum foil is present and therefore deep drawing can be made, and no pinhole is caused. The sealing causes no short-circuiting between the external packaging material and the terminal, and moisture is unlikely to penetrate the battery and no battery expansion occurs in about one year or longer.

In Example 6, the moisture absorbing material is added to each of the two bonding agent layers, and the effect is improved such that no battery expansion occurs and the life is extended and the battery thickness is not increased.

In Example 7, a deposited layer is formed on the outside the layer containing a moisture absorbing material, which indicates that the effect is improved such that no battery expansion occurs and the life is extended and the battery thickness is not increased.

In Example 8, two such deposited layers are formed, which indicates that the effect is further improved such that no battery expansion occurs and the life is extended and the battery thickness is not increased.

Example 9 is directed to an external packaging material of a three-layer structure having a moisture absorbing material and a deposited layer, and, also in this case, it is apparent that no battery expansion occurs and the life is extended.

From a comparison with Example 1, Example 10, in which vinylon having slightly poor moisture barrier properties is used as an outer resin, it is found that the use of a resin having poor moisture barrier properties in the layer outside of the moisture absorbing material shortens the battery life.

Further, from a comparison between Example 11 and Example 12, it is found that the moisture absorbing material is preferably incorporated into an inner layer.

In Example 1-2, a resin leaf is placed on the terminal, and the present invention may provide this construction and has wide selection of the inner resin layers.

In Examples 1-3 to 1-5, the sealed width is changed, which indicates that a significant effect is exhibited in each Example and the battery capacity is advantageously improved.

Further, in Examples 1-6 to 1-8, the amount of the moisture absorbing material added is changed, which indicates that the use of the moisture absorbing material in too small an amount tends to shorten the battery life and, conversely, the use of the moisture absorbing material in too large an amount adversely affects the adhesion or denseness of the layer, so that the layer is likely to contain therein moisture. From these Examples, it is found that a desired amount of the moisture absorbing material added is 0.1% to 45%.

Hereinabove, the embodiments are described in detail with reference to the Examples, but the present embodiments are not limited to the above Examples, and can be changed or modified on the basis of the technical concept of the present disclosure.

For example, the values and materials mentioned in the above embodiments are merely examples and, if necessary, values or materials different from them may be used. The embodiments can be applied to any batteries using external packaging composed of a laminated film, and the form of the battery device contained in the packaging is not limited to the spirally wound type.

In the Examples, as a sealer, one having a form notched at a portion put on the terminal can be used. Shaping of the external packaging material can be made by (e.g., blow molding or deep drawing instead of vacuum molding). Instead of the microcapsules, a coating composition which reacts with the electrolytic solution to develop color may be applied.

In the embodiments, a moisture absorbing material is incorporated into an appropriate layer in the laminated structure of a laminated film using no metallic foil, and therefore there can be provided an external packaging material for battery device, which is composed of a thin laminated film having no metallic foil, e.g., no Al foil. The external packaging device has an advantages in that, in a case where a battery device is covered with the laminated film, both moisture penetration through the cross-section of the sealed portion and moisture penetration through the whole of the laminated film are prevented for a relatively long term. The external packaging device has another advantage in that the external packaging material can achieve a battery which does not suffer lowering in the moisture penetration prevention properties during the production of the battery. The present embodiments also provides a nonaqueous electrolyte secondary battery and a battery pack using the same.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A nonaqueous electrolyte secondary battery comprising:
a battery device composed of a positive electrode and a negative electrode which are stacked with a separator disposed in between and spirally wound; and
an external packaging material for covering the battery device, in which the external packaging material is sealed around the battery device so that electrode terminals of the positive electrode and the negative electrode are protruded from the battery device to an exterior of the external packaging material from the battery device,
wherein the external packaging material is composed of a laminated film having a laminated structure having two or more resin film layers stacked,
wherein the laminated structure has no metallic foil,
wherein at least one layer in the resin film layers of the laminated structure containing no metallic foil contains 0.1 wt % to 45 wt % of a material mixed thereinto, the material selected from the group consisting of: an oxide, a chloride, a sulfate, and a nitrate of sodium, potassium, magnesium, or calcium, a polyacrylate represented by the following general formula ($-CH_2-CH(COOM)-$)$_n$, where M represents sodium, potassium, magnesium, or calcium, and n represents a natural number of 100 to 5,000, and mixtures thereof, and
wherein the at least one layer in the resin film layers has a thickness in the range of 10 µm to 50 µm.

2. A nonaqueous electrolyte secondary battery comprising:
a battery device composed of a positive electrode and a negative electrode which are stacked with a separator disposed in between and spirally wound; and
an external packaging material for covering the battery device, in which the external packaging material is sealed around the battery device so that electrode terminals of the positive electrode and the negative electrode are protruded from the battery device to an exterior of the external packaging material from the battery device,
wherein the external packaging material is composed of a laminated film having a laminated structure having two or more resin film layers stacked with a bonding agent layer in between,
wherein the laminated structure has no metallic foil,
wherein the bonding agent layer or at least one layer in the bonding agent layers of the laminated structure containing no metallic foil contains 0.1 wt % to 45 wt % of a material mixed thereinto, the material selected from the group consisting of: an oxide, a chloride, a sulfate, and a nitrate of sodium, potassium, magnesium, or calcium, a polyacrylate represented by the following general formula ($-CH_2-CH(COOM)-$)$_n$ where M represents sodium, potassium, magnesium, or calcium, and n represents a natural number of 100 to 5,000, and mixtures thereof, and
wherein the bonding agent layer or at least one layer in the bonding agent layers has a thickness in the range of 10 µm to 50 µm.

3. The nonaqueous electrolyte secondary battery according to claim 1 wherein
the whole of the interface at a sealed portion of the external packaging material and the electrode terminal has disposed thereon a resin film mainly composed of at least one member selected from the group consisting of maleic anhydride-modified polyethylene, maleic anhydride-modified polypropylene, polyethylene containing a titanate coupling agent, polypropylene containing a titanate coupling agent, an ionomer, an ethylene-acrylic acid copolymer, an ethylene-methacrylic acid copolymer, an ethylene-vinyl acetate copolymer, casted polyethylene, casted polypropylene, a casted ethylene-vinyl acetate copolymer, a casted ethylene-acetic acid-vinyl alcohol copolymer, a casted ethylene-methyl acrylate copolymer, a casted ethylene-methyl methacrylate copolymer, casted polyacrylonitrile, and casted polyethylene terephthalate.

4. The nonaqueous electrolyte secondary battery according to claim 1,
wherein the interface at a sealed portion of the external packaging material and the electrode terminal has no sealant film,
wherein an innermost layer in the resin film layers is formed of a film or hot-melt layer mainly composed of at least one resin selected from the group consisting of casted maleic anhydride-modified polyethylene, casted maleic anhydride-modified polypropylene, casted polyethylene containing a titanate coupling agent, casted polypropylene containing a titanate coupling agent, a casted ionomer, a casted ethylene-acrylic acid copolymer, and a casted ethylene-methacrylic acid copolymer, and
wherein the innermost layer is directly heat-bonded to the electrode terminal.

5. The nonaqueous electrolyte secondary battery according to claim 1 wherein the sealed portion of the external packaging material and the electrode terminal has no sealant film, and wherein the electrode terminal has a primer-processed surface.

6. The nonaqueous electrolyte secondary battery according to claim 1, wherein the external packaging material has a space for containing the battery device.

7. The nonaqueous electrolyte secondary battery according to claim 6,
wherein part of the sealed portion of the external packaging material formed around the battery device forms an electrode lead-out portion for sealing the external packaging material so that the electrode terminals are electrically introduced from the battery device, and
wherein the electrode lead-out portion has a sealed width ranging from 0.5 mm to 3.5 mm.

8. The nonaqueous electrolyte secondary battery according to claim 7,
wherein the battery device has a rectangular plate shape, in which the electrode terminal extends from one side of the battery device and is sealed at the electrode lead-out portion of the external packaging material, wherein the sealed portion of the external packaging material constitutes a rectangular frame form around the battery device, in which the electrode lead-out portion constitutes one side of the sealed portion, wherein in the sealed portion constituting the rectangular frame form, the sealed portions constituting two sides substantially perpendicular to the electrode lead-out portion have a width equal to or smaller than the thickness of the battery device, and wherein each of the side sealed portions forms a sidewall by bending once at an angle of 80° to 100° to the surface of the electrode lead-out portion.

9. The nonaqueous electrolyte secondary battery according to claim 1, wherein at least one layer in the resin film layers constituting the external packaging material includes means for detecting leakage of the nonaqueous electrolytic solution.

10. The nonaqueous electrolyte secondary battery according to claim 1, wherein the material is selected from the group consisting of: sodium sulfate, magnesium sulfate, calcium oxide, calcium chloride, magnesium chloride, sodium nitrate, the polyacrylate represented by the following general formula ($-CH_2-CH(COOM)-$)$_n$ where M represents sodium, potassium, magnesium, or calcium, and n represents a natural number of 100 to 5,000, and mixtures thereof.

11. The nonaqueous electrolyte secondary battery according to claim 2, wherein the material is selected from the group consisting of: sodium sulfate, magnesium sulfate, calcium oxide, calcium chloride, magnesium chloride, sodium nitrate, the polyacrylate represented by the following general formula ($-CH_2-CH(COOM)-$)$_n$ where M represents sodium, potassium, magnesium, or calcium, and n represents a natural number of 100 to 5,000, and mixtures thereof.

12. The nonaqueous electrolyte secondary battery according to claim 1, wherein the material is contained in an inner layer of the resin film layers.

13. The nonaqueous electrolyte secondary battery according to claim 1, wherein an outer resin layer comprises a film composed mainly of oriented nylon, oriented polyethylene terephthalate, oriented polyethylene naphthalate, oriented polybutylene terephthalate, oriented polybutylene naphthalate, oriented polypropylene, oriented polyethylene, oriented polyacrylonitrile, polyvinyl chloride, polyvinylidene chloride, polyvinylidene chloride-coated cellophane, a polyamide resin such as 6-nylon, a polyester resin such as PET, polyimide, polyphenylene ether, polysulfone, a mixed resin of the above two or more resins, a fluororesin such as polychlorotrifluoroethylene (PCTFE) or polytetrafluoroethylene (PTFE), polyvinylidene chloride, a polyvinyl alcohol resin, an amorphous resin such as amorphous cycloolefin, a resin having a surface coated with polyvinylidene chloride or a polyvinyl alcohol resin, a resin having a surface deposited or coated with $Si_xO_y$, $Al_xO_y$, or thin film ceramic, or a resin obtained by adding a thermosetting resin to a layer silicate.

14. The nonaqueous electrolyte secondary battery according to claim 2, wherein an outer resin layer comprises a film composed mainly of oriented nylon, oriented polyethylene terephthalate, oriented polyethylene naphthalate, oriented polybutylene terephthalate, oriented polybutylene naphthalate, oriented polypropylene, oriented polyethylene, oriented polyacrylonitrile, polyvinyl chloride, polyvinylidene chloride, polyvinylidene chloride-coated cellophane, a polyamide resin such as 6-nylon, a polyester resin such as PET, polyimide, polyphenylene ether, polysulfone, a mixed resin of the above two or more resins, a fluororesin such as polychlorotrifluoroethylene (PCTFE) or polytetrafluoroethylene (PTFE), polyvinylidene chloride, a polyvinyl alcohol resin, an amorphous resin such as amorphous cycloolefin, a resin having a surface coated with polyvinylidene chloride or a polyvinyl alcohol resin, a resin having a surface deposited or coated with $Si_xO_y$, $Al_xO_y$, or thin film ceramic, or a resin obtained by adding a thermosetting resin to a layer silicate.

15. The nonaqueous electrolyte secondary battery according to claim 1, wherein the material is contained in an outer layer of the resin film layers.

16. The nonaqueous electrolyte secondary battery according to claim 1, wherein an outer layer of the resin film layers is coated with a resin selected from the group consisting of: polyvinylidene chloride, polyvinyl alcohol, $Si_xO_y$, $Al_xO_y$ and a ceramic material.

17. The nonaqueous electrolyte secondary battery according to claim 1, wherein an outer layer of the resin film layers comprises oriented polypropylene coated with polyvinylidene chloride and a first aluminum oxide deposited film, and wherein an inner layer of the resin film layers comprises casted polypropylene coated with polyvinylidene chloride and a second aluminum oxide deposited film.

18. The nonaqueous electrolyte secondary battery according to claim 1, wherein the material is magnesium sulfate.

* * * * *